United States Patent
Espinasse

(10) Patent No.: US 6,691,743 B2
(45) Date of Patent: Feb. 17, 2004

(54) FLEXIBLE PIPE WITH WIRE OR STRIP WINDING FOR MAINTAINING ARMOURS

(75) Inventor: Philippe Espinasse, Bihorel (FR)

(73) Assignee: Coflexip (FR)

(*) Notice: Subject to any disclaimer, the term of this patent is extended or adjusted under 35 U.S.C. 154(b) by 0 days.

(21) Appl. No.: 10/257,306

(22) PCT Filed: Apr. 5, 2001

(86) PCT No.: PCT/FR01/01023
§ 371 (c)(1),
(2), (4) Date: Oct. 10, 2002

(87) PCT Pub. No.: WO01/86184
PCT Pub. Date: Nov. 15, 2001

(65) Prior Publication Data
US 2003/0159745 A1 Aug. 28, 2003

(30) Foreign Application Priority Data
May 10, 2000 (EP) .............................................. 00401278

(51) Int. Cl.[7] .............................................. F16L 11/16
(52) U.S. Cl. ..................... 138/134; 138/135; 138/127; 138/129
(58) Field of Search .......................... 138/134, 135, 138/137, 138, 136, 140, 129, 130, 177, 178, 127, 172

(56) References Cited

U.S. PATENT DOCUMENTS

| 3,687,169 | A | * | 8/1972 | Reynard ..................... 138/134 |
| 4,098,298 | A | * | 7/1978 | Vohrer ........................ 138/122 |
| 4,344,462 | A | * | 8/1982 | Aubert et al. ............... 138/130 |
| 4,800,928 | A | * | 1/1989 | Kanao ......................... 138/122 |
| 5,269,349 | A | * | 12/1993 | Sugier et al. ............... 138/172 |
| 5,275,209 | A | * | 1/1994 | Sugier et al. ............... 138/135 |
| 5,645,110 | A | | 7/1997 | Nobileau .................... 138/134 |
| 5,730,188 | A | * | 3/1998 | Kalman et al. ............. 138/135 |
| 6,024,135 | A | * | 2/2000 | Nobileau .................... 138/134 |
| 6,039,083 | A | * | 3/2000 | Loper ......................... 138/135 |
| 6,098,667 | A | * | 8/2000 | Odru ........................... 138/134 |
| 6,253,793 | B1 | * | 7/2001 | Dupoiron et al. .......... 138/135 |
| 6,338,365 | B1 | * | 1/2002 | Odru ........................... 138/134 |
| 6,354,333 | B1 | * | 3/2002 | Dupoiron et al. .......... 138/135 |
| 6,363,974 | B1 | * | 4/2002 | Perez et al. ................. 138/130 |
| 6,415,825 | B1 | * | 7/2002 | Dupoiron et al. .......... 138/127 |

FOREIGN PATENT DOCUMENTS

| DE | 2742918 | 3/1979 |
| FR | 2654795 | 5/1991 |
| FR | 2727738 | 6/1996 |
| FR | 2744511 | 8/1997 |
| FR | 2779797 | 12/1999 |
| GB | 2332258 | 6/1999 |
| WO | 92/11487 | 7/1992 |
| WO | 98/25063 | 6/1998 |
| WO | 00/09899 | 2/2000 |

OTHER PUBLICATIONS

"Specification for Unbonded Flexible Pipe", *American Petroleum Institute*, Exploration and Production Dept., API Specification 17J, First Edition: Dec. 1996, Effective Date: Mar. 1, 1997, pp. 1–42.

"Recommended Practice for Flexible Pipe", *American Petroleum Institute*, Exploration and Production Dept., API Recommended Practice 17B, Second Edition: Jul. 1, 1998, Effective Date: Dec. 1, 1998, pp. 1–132.

* cited by examiner

*Primary Examiner*—Patrick Brinson
(74) *Attorney, Agent, or Firm*—Ostrolenk, Faber, Gerb & Soffen, LLP

(57) ABSTRACT

A flexible tubular pipe having, from the inside outwards, at least, a carcass of an interlocked metal strip, an internal sealing sheath, a cylindrical pressure vault of a winding of an interlocked profiled metal wire wound in a helix with a short pitch, at least one ply of tensile armor wires wound with a long pitch, a wire wound with a short pitch over the ply of armor wires, the wires having a deformable sheath that partially penetrates the gaps between the windings in the at least one ply of armor wires, and an external protective sealing sheath.

20 Claims, 2 Drawing Sheets

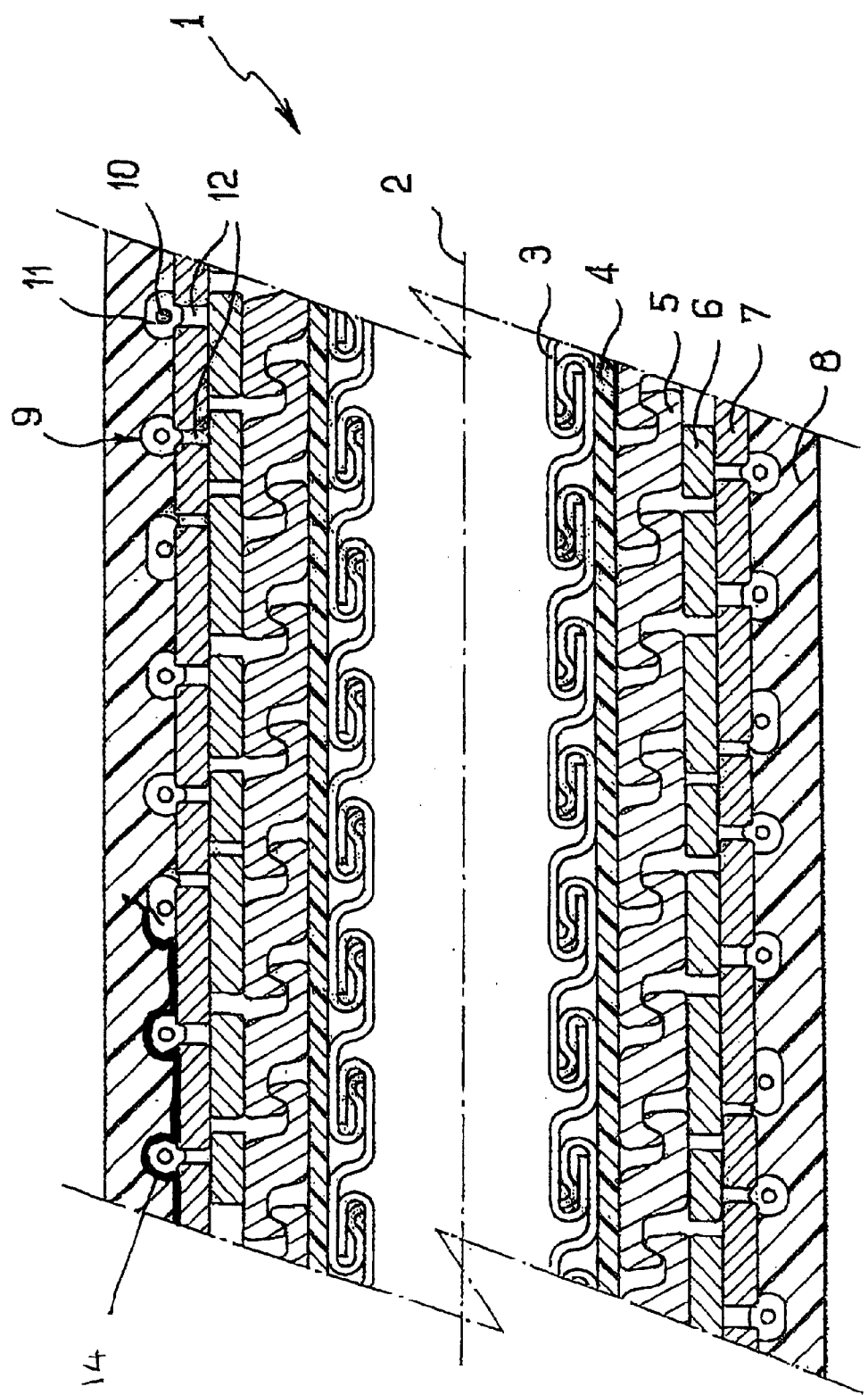
FIG_1

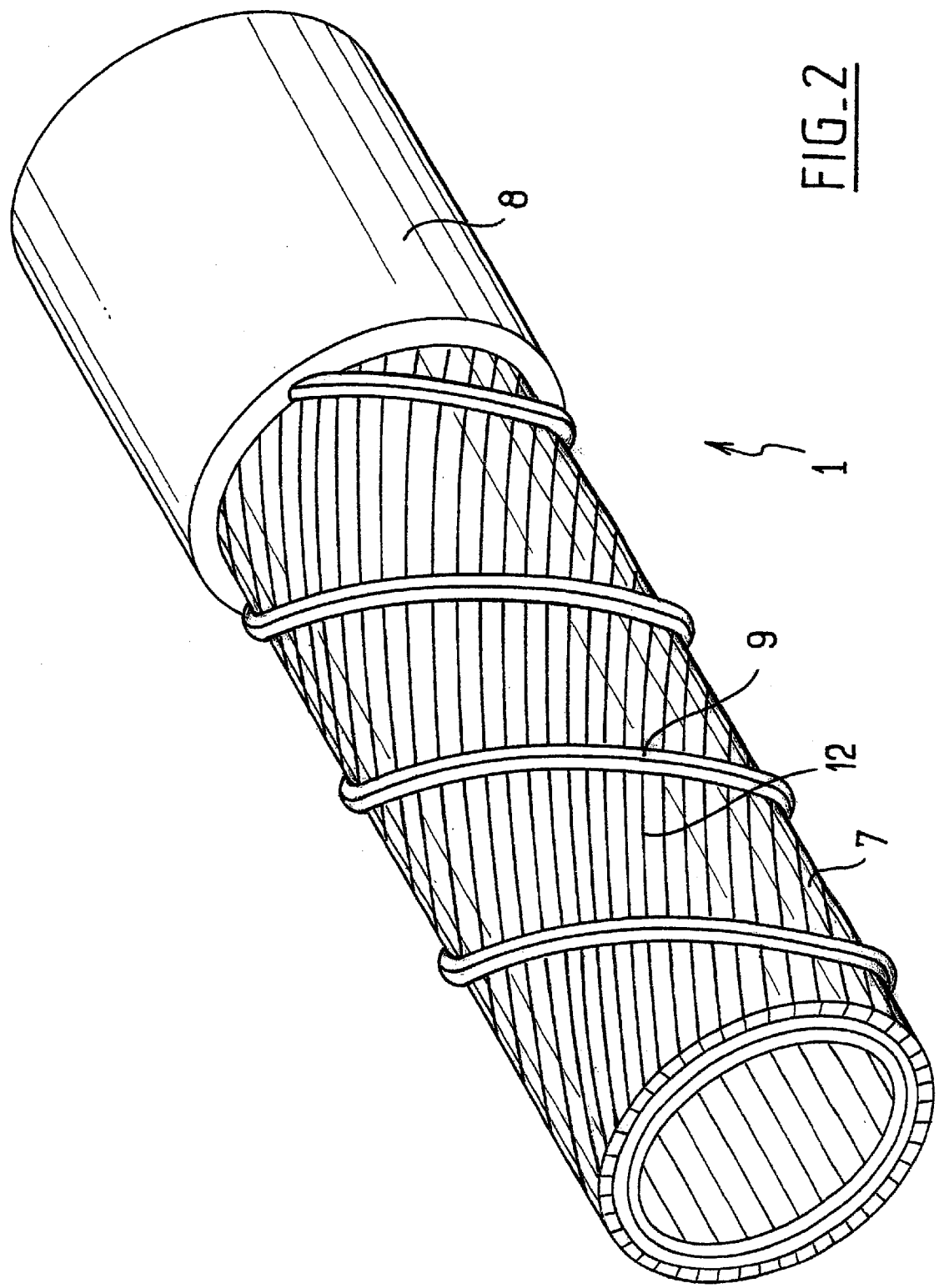
FIG._2

FLEXIBLE PIPE WITH WIRE OR STRIP WINDING FOR MAINTAINING ARMOURS

BACKGROUND OF THE INVENTION

The present invention relates to a flexible pipe for transporting, over long distances, a fluid which is under pressure and possibly at a high temperature, such as a gas, petroleum, water or other fluids. The invention relates most particularly to a pipe intended for offshore oil exploration. It relates especially, first, to the flow lines, that is to say flexible pipes unwound from a barge in order to be laid generally on the bottom of the sea and connected to the subsea installations, such pipes working mainly in static mode, and, secondly, to the "risers", that is to say flexible pipes which are unwound from a surface installation such as a platform and are connected to the subsea installations and most of which do not lie below the seabed, such pipes working essentially in dynamic mode.

The flexible pipes used offshore must be able to resist high internal pressures and/or external pressures and also withstand longitudinal bending or twisting without the risk of being ruptured.

They have various configurations depending on their precise use but in general they satisfy the constructional criteria defined in particular in the standards API 17 B and API 17 J drawn up by the American Petroleum Institute under the title "Recommended Practice for Flexible Pipe" and "Specification for Unbonded Flexible Pipe". Reference may also be made to documents FR 2 654 795 A, WO 98/25 063 A, FR 2 727 738 A and FR 2 744 511 A.

A flexible pipe comprises in general, from the inside outwards:
- a structural assembly able to resist radial forces, composed of a sealing sheath made of a plastic, generally a polymer, able to resist to a greater or lesser extent the chemical action of the fluid to be transported, and of a winding of a metal element wound in a helix with a short pitch;
- at least one ply (and generally at least two crossed plies) of tensile armour wires wound with a long pitch, that is to say the lay angle measured along the longitudinal axis of the pipe is less than 60°; and
- an external protective sealing sheath made of a polymer.

In certain pipes, the said structural assembly is formed by a carcass consisting of an interlocked metal strip surmounted by the said sheath.

In pipes called "smooth-bore" pipes, the said structural assembly consists of:
- the said internal sealing sheath; and
- a pressure vault resistant mainly to the pressure developed by the fluid in the sealing sheath and consisting of the winding of one or more interlocked profile metal wires (which may or may not be self-interlockable) wound in a helix with a short pitch (that is to say with a winding angle of close to 90°); the profiled wires have a cross section in the form of a Z or a T or derivatives thereof (teta or zeta) or in the form of a U, or more advantageously in the form of an I (cf. document WO 00/09899).

In pipes called "rough-bore" pipes, there is also, inside the internal sealing sheath, a carcass consisting of an interlocked metal strip which serves to prevent the pipe from collapsing under the external pressure. However, the pressure vault also helps to withstand the crushing forces.

It is known, for example from the document WO 92/11487 in the name of the Applicant, to provide, between the armour plies and the outer sheath, an adhesive tape wound over the upper ply in order to make it easier for it to be restrained, at least temporarily, during manufacture while waiting for the external sheath to be placed over it. This restraining is especially necessary when the armour wires are lubricated in order to protect them from corrosion. It is also known to wind around the armour wires, after the adhesive tape, a Kevlar® tape or a tape of another similar high-strength material, intended to resist the end cap effect (bird-cage deformation).

Flexible-pipe laying systems, illustrated for example by the document "Recommended Practice for Design of Risers for Floating Production Systems and Tension-leg Platforms", drawn up by the American Petroleum Institute, generally include a system for taking up the tension, or tensioner, of the linear contact (caterpillar track) type, which grips a length of flexible pipe by means of at least one pair of opposed endless belts, the objective being to transfer the gripping force to the ply of outer armour wires. The forces exerted are designed in order to take account of the minimal friction coefficient which exists between the various layers of the pipe between the caterpillar track blocks and the armour wires of the flexible pipe: this minimal coefficient occurs at the interface between the external armour ply and the superjacent adhesive, with a value taken into account of less than 0.1. This very low value means that the flexible pipe has to be greatly compressed so as to be able to transfer reasonable tangential retaining forces. This large axial compression may consequently mean that the crush resistance of the pipe must be increased, and therefore the pressure vaults must be reinforced; this increases the suspended weight and therefore increases the radial pressure to be exerted by the tensioners.

In addition, the forces exerted by the blocks must not be increased too much with the risk of damaging the sheath where it comes into contact with the blocks, the limit adopted being set to forces of about 120 metric tons per meter.

SUMMARY OF THE INVENTION

The objective of the invention is to provide a flexible pipe which has the overall structure mentioned above but is designed so as not to have these limitations due to the excessively low friction coefficient between the external armour ply and the superjacent layer (defined around the external armour ply by a winding of adhesive tape and/or a winding of a tape of strong material and/or the external sheath itself).

The objective of the invention is achieved by virtue of a flexible tubular pipe comprising, from the inside outwards, at least: a sealed structural assembly resistant to radial forces, composed of a sealing sheath made of a plastic, generally a polymer, able to withstand to a greater or lesser extent the chemical action of the fluid to be transported, and of a winding of a metal element wound in a helix with a short pitch; and at least one ply of tensile armour wires wound with a long pitch and an external protective sealing sheath, characterized in that at least one strong continuous elongate element with a deformable jacket (peripheral region) is wound helically with a short pitch directly around the said armour ply, preferably in the opposite winding direction to that of the armour ply, so that the spiralled continuous elongate element, crossed or not with respect to the ply, is partially inserted between the gaps between the turns of the ply and blocks the latter. Optionally, the armour ply may be blocked by the spiralled continuous elongate element and these may be covered with an adhesive tape and/or a strong aramid fibre tape (for example Kevlar® tape), even though under certain conditions the continuous elongate element according to the invention makes it possible to dispense with these layers. The continuous elongate element is a wire or a tape; in the first case, it is advantageous for the winding to be done with non-touching turns; in the second case, the winding may be done with touching turns and even with partial overlap between one tape turn and another. The wire (or tape) increases the friction coefficient at the armour/superjacent layer interface from a value of less than 0.1 to a value which exceeds 0.2 or even 0.4. This is because, whereas without the wire of the invention the force at the interface between the external armour ply and the superjacent layer is transmitted by pure friction, with the low coefficient mentioned, the said force is transferred, when the wire of the invention is present, partially by positive mating (complementary shapes) and by shear at the wire, which penetrates both the armour ply and the superjacent layer. The wire can also serve to prevent bird-cage deformation due to the reverse end cap effect. A material with the necessary strength is chosen and the winding pitch is reduced as required, in order to allow his effect. The wire may then replace the Kevlar® tape used previously for this purpose. The winding angle measured along the longitudinal axis is not critical and is, for example, between about 50° and 85°.

The spiralled wire may consist of a single material combining both the strength property and the deformability property, for example an aluminium wire, or else a wire with a core providing the strength (made of steel, carbon fibre, aramid fibre such as Kevlar®, etc.) surrounded by a deformable sheath (for example made of a thermoplastic).

By virtue of the invention, it is possible to reduce the gripping forces exerted by the pads and/or to lay heavier pipes or to lay pipes at greater depth.

Further advantages and features will become apparent upon reading the description which follows, with reference to the appended schematic drawings showing, by way of example, one embodiment of a flexible pipe according to the invention. In these drawings:

BRIEF DESCRIPTION OF THE DRAWINGS

FIG. 1 is a longitudinal sectional view of a pipe of the "rough-bore" type to which the invention is applied;

FIG. 2 is a simplified perspective view with partial cut-away of the same pipe.

DESCRIPTION OF A PREFERRED EMBODIMENT

The pipe 1 of axis 2 comprises, from the inside outwards, a carcass 3 made of an interlocked metal strip, a polymeric internal sealing sheath 4, a metal vault 5 consisting of the winding of at least one profiled metal wire (here, a self-interlockable zeta wire) wound in a helix with a short pitch, an armour layer able to resist the axial tension in the longitudinal direction of the pipe and consisting of a pair of crossed armour plies 6, 7 wound in opposite directions with a long pitch, and a polymeric external sealing sheath 8. Other layers (not shown) may be provided, according to the type and the purpose of the pipe, such as, for example, a hoop layer consisting of a winding with a short pitch of a rectangular wire interposed between the pressure vault 5 and the first armour ply 6, other pairs of armour plies and intermediate sheaths placed between various armour plies.

According to the invention, wound around the outermost armour ply 7, with a short pitch, preferably in the opposite direction to that of the ply and with a certain gripping force, is a rod or wire 9 consisting of a strong core 10 and of a pliant sheath 11 or jacket which meets, more or less transversely, the armour wires of the ply 7 and partially penetrates the helical gaps 12 existing between two armour wires. All the gaps 12 are thus blocked by the sinking-in of the sheath 11, thereby stabilizing the armour wires. The pliancy of the sealing sheath 8, constituting the layer superjacent to the armour ply and to the wire 9, allows the wire 9 to be at least partially impressed thereinto, contributing to the positive blocking and the increase in the friction coefficient at the interface.

Optionally, a tape 14, either a tape of strong aramid fiber (for example, Kevlar®) or an adhesive tape is wrapped over the armour plies and the rod or wire 9 applied to the armour ply 7, as shown in the left part of FIG. 1.

What is claimed is:

1. A flexible tubular pipe having an inside and an outside, the pipe comprising from the inside outward to the outside;
   a sealed structural assembly resistant to radial forces, the structural assembly comprising:
   an internal sealing sheath of a material to withstand chemical action of a fluid to be transported inside the internal sealing sheath of the pipe; and
   a winding of a metal element wound in a helix and having a short pitch;
   at least one ply of tensile armor wires wound with a long pitch such that the windings of at least one ply of armor wires provides gaps between the windings of the armor wires;
   at least one strong, continuous, elongate element wound helically and with a short pitch and directly around the at least one armor ply, so that the elongate element is partially inserted into the gaps between the windings of the armor wires of the at least one ply; and
   an external sheath.

2. The pipe of claim 1, wherein the internal sealing sheath is of a plastic material.

3. The pipe of claim 2, wherein the internal sealing sheath is of a polymer.

4. The pipe of claim 1, wherein the continuous elongate element includes a deformable jacket around the elongate element and the jacket is partially inserted into the gaps between the windings of the armor wires.

5. The pipe of claim 4, wherein the external sheath and the jacket are of such materials that the hardness thereof is such that the jacket of the continuous elongate element is partially impressed into the external sheath.

6. The pipe of claim 2, wherein the external sheath and the continuous elongate element are of such materials that the hardness thereof is such that the continuous elongate element is partially impressed into the external sheath.

7. The pipe of claim 1, wherein the external sheath and the continuous elongate element are of such materials that the hardness thereof is such that the continuous elongate element is partially impressed into the external sheath.

8. The pipe of claim 7, wherein the at least one armor ply is wound in a first direction and the continuous elongate element is wound in a second direction opposite the first direction.

9. The pipe of claim 1, wherein the at least one armor ply is wound in a first direction and the continuous elongate element is wound in a second direction opposite the first direction.

10. The pipe of claim 1, further comprising a tape wound over the armor ply and over the continuous elongate element.

11. The pipe of claim 10, wherein the tape is an adhesive tape.

12. The pipe of claim 11, wherein the tape is a strong aramid fiber tape.

13. The pipe of claim 1, wherein the continuous elongate element is of a single strong deformable material.

14. The pipe of claim 4, wherein the continuous elongate element is comprised of a strong core surrounded by a deformable sheath so that the jacket is deformable.

15. The pipe of claim 1, wherein the continuous elongate element is a wire.

16. The pipe of claim 15, wherein the wire of the continuous elongate element is wound with non-touching turns of windings.

17. The pipe of claim 12, wherein the continuous elongate element is a tape.

18. The pipe of claim 17, wherein the tape of the elongate element is wound with overlapping turns.

19. The pipe of claim 1, further comprising a cylindrical pressure vault of the structural assembly comprised of a profiled metal wire wound in a helix with short pitch and successive turns of the profiled wire being interlocked.

20. The pipe of claim 1, wherein the structural assembly further comprises a carcass comprised of an interlocked metal strip surrounded by the internal sealing sheath.

* * * * *